Nov. 20, 1923. 1,474,698
E. WINTER
PICTURE AND PATTERN BEHIND WHICH A LIGHT REFLECTING METALLIC SHEET IS LAID
Filed Jan. 15, 1914
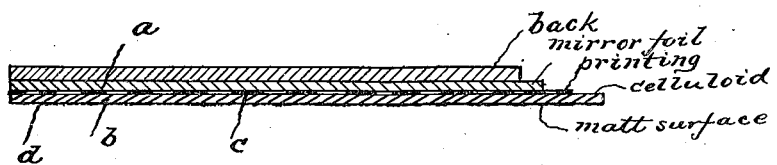
Inventor
Ernest Winter
by Henry Orth
Atty Patented Nov. 20, 1923.

1,474,698

UNITED STATES PATENT OFFICE.

ERNEST WINTER, OF CANNSTATT, NEAR STUTTGART, GERMANY.

PICTURE AND PATTERN BEHIND WHICH A LIGHT-REFLECTING METALLIC SHEET IS LAID.

Application filed January 15, 1914. Serial No. 812,862.

(GRANTED UNDER THE PROVISIONS OF THE ACT OF MARCH 3, 1921, 41 STAT. L., 1313.)

*To all whom it may concern:*

Be it known that I, ERNEST WINTER, residing at Cannstatt, near Stuttgart, Germany, Dennerstrasse 100, have invented certain new and useful Improvements in Pictures and Patterns Behind Which a Light-Reflecting Metallic Sheet is Laid, of which the following is a specification.

My invention relates to artistic pictures, and comprises a light reflecting or mirror-like reflector used as a backing for a picture printed on celluloid foil.

The picture is printed in transparent colors on the polished side of such foil and this polished, printed side is laid against the reflector. The opposite side of the foil is matt.

Such a combination produces pictures of a new and peculiar effect. The color tones are soft and diffused and the effect is very pleasing.

The printing should be done with a small number of colors in order not to obtain too many superposed layers of ink, as in color lithography.

I have found that good results will be obtained with collotype, collotype in color, engraving, and with half-tone screen printing in one to four colors.

Very beautiful, soft nuances and shades are obtained with colored half-tone prints, the colors fully retaining their luminous power and transparency.

The figure of the drawing shows a cross section of the device.

I use as a reflecting sheet *a* to be laid against the polished, printed side of the celluloid film *b*, a glass mirror, polished reflecting sheet metal, sheet silver, silver paper or mirror foil, and metallic foils, as for instance tin foil in good planished quality.

The reflector and print *c* may be held together by frames, by mounting them on polished steel backing, by making them in passe-partout, or otherwise pasting them together, &c.

The celluloid films may be matted on their outer exposed face *d* in any manner.

I claim—

1. A picture comprising a reflecting backing and a celluloid film having a picture printed in transparent colors on its polished side adjacent said backing and a matt outer surface.

2. A picture comprising in combination a reflecting metallic foil backing, a celluloid film against said backing and having a polished and a matt surface, and a picture printed in transparent colors on the polished side of said film and adjacent said backing, the matt surface of said film being exposed to view.

In testimony whereof I affix my signature in presence of two witnesses.

ERNEST WINTER.

Witnesses:
FRIDA KLAIHR,
ERNEST OUTERMANN.